United States Patent [19]

Sonai et al.

[11] Patent Number: 5,344,721
[45] Date of Patent: Sep. 6, 1994

[54] SOLID POLYMER ELECTROLYTE FUEL CELL APPARATUS

[75] Inventors: Atsuo Sonai, Yokohama; Kenji Murata, Tokyo, both of Japan

[73] Assignee: Kabushiki Kaisha Toshiba, Kanagawa, Japan

[21] Appl. No.: 38,986

[22] Filed: Mar. 29, 1993

[30] Foreign Application Priority Data

Mar. 31, 1992 [JP] Japan .................................. 4-074813

[51] Int. Cl.$^5$ .............................................. H01M 8/18
[52] U.S. Cl. .......................................... 429/20; 429/30; 429/34; 429/26
[58] Field of Search ................ 429/30, 26, 20, 34

[56] References Cited

U.S. PATENT DOCUMENTS

| | | | |
|---|---|---|---|
| 3,982,962 | 9/1976 | Bloomfield | 429/20 |
| 4,865,926 | 9/1989 | Levy et al. | 429/20 |
| 4,994,331 | 2/1991 | Cohen | 429/20 |
| 5,192,627 | 3/1993 | Perry, Jr. et al. | 429/17 |

FOREIGN PATENT DOCUMENTS

| | | | |
|---|---|---|---|
| 0155695 | 9/1985 | European Pat. Off. | 429/34 |
| 3-269955(A) | 12/1991 | Japan . | |
| 4-286870(A) | 10/1992 | Japan . | |

*Primary Examiner*—Kathryn Gorgos
*Attorney, Agent, or Firm*—Finnegan, Henderson, Farabow, Garrett & Dunner

[57] ABSTRACT

A fuel cell proper is constructed by superposing a plurality of unit cells having a solid polymer electrolyte membrane held between an anode and a cathode. This fuel cell proper is cooled with a liquid having a boiling point closely approximating the working temperature of the fuel cell. Water and a liquid fuel as liquid raw materials are gasified with a liquid raw material gasifying mechanism. This liquid raw material gasifying mechanism uses, as at least part of the heat source for gasification of water, the waste heat from the reformer and the heat possessed by the reformed gas. The gasified water and liquid fuel are reformed by the reformer into a hydrogen rich gas. The gas thus produced is supplied to the anode in the fuel cell proper. The cathodes are supplied with air to effect a reaction for power generation.

17 Claims, 9 Drawing Sheets

FIG. 10
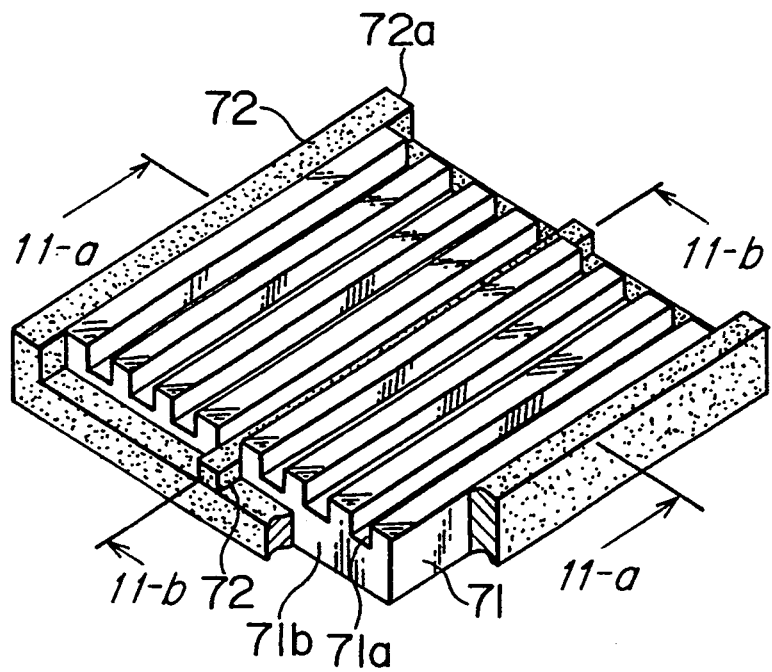
FIG. 11-a
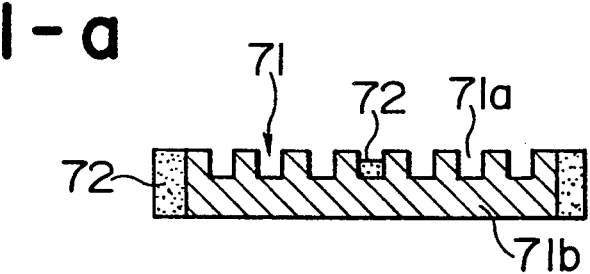
FIG. 11-b
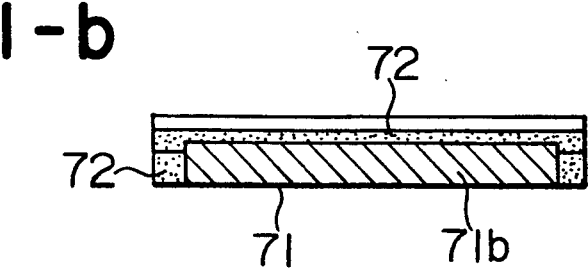

SOLID POLYMER ELECTROLYTE FUEL CELL APPARATUS

BACKGROUND OF THE INVENTION

This invention relates to a solid polymer electrolyte type fuel cell apparatus using as the electrolyte thereof a solid polymer possessing ionic conductivity.

In recent years, the fuel cells have been attracting keen attention as a highly efficient energy conversion apparatus. The fuel cells are broadly divided by the kind of electrolyte used therein into low-temperature operating fuel cells of the alkaline aqueous solution type, solid polymer electrolyte type, and phosphoric acid type and high-temperature operating fuel cells of the fused carbonate type and solid oxide electrolyte type.

Of these fuel cells, the fuel cells which use as the electrolyte thereof a solid polymer electrolyte membrane (hereinafter referred to as "PE membrane") possessing protonic conductivity (hereinafter referred to briefly as "PEFC") allow production of a high power density from a compact structure and permit operation thereof with a simple system and, because of these features, have been arresting attention as a mobile power source for aerospace apparatus and vehicles.

The PE membranes which have been known to date include polystyrene type cation-exchange membranes possessing a sulfonic acid group, membranes of a mixture of fluorocarbon sulfonic acid with polyvinylidene fluoride, and membranes having trifluoro-ethylene grafted to a fluorocarbon matrix, for example. Recently, perfluorocarbon sulfonic acid membranes (such as those produced by DuPont and marketed under trademark designation of "Nafion") have been finding utility. The PEFC's using the PE membrane of this quality have a unit cell which has the PE membrane held between a pair of porous electrodes, i.e. a fuel electrode (hereinafter referred to as anode) and an oxidizing agent electrode (hereinafter referred to as cathode) fulfilling respectively the functions of a gas diffusing layer and a catalytic layer and has grooved collectors of a fuel chamber and an oxidizer chamber formed outside the electrodes. They are formed by having a plurality of such unit cells superposed through the medium of a cooling plate.

The power generating apparatus using the PEFC of this kind is generally constructed as combined with a reformer apparatus capable of reforming a liquid fuel inclusive of water as an example into a hydrogen rich gas. FIG. 14 illustrates the construction of a conventional fuel cell power generating apparatus. In the diagram, 1 stands for a PEFC proper having superposed a plurality of unit cells provided with a PE membrane 4 held between an anode 2 and a cathode 3. To the anode 2, a water vapor-containing fuel gas (a hydrogen rich gas) is supplied from a reformer 5. To the cathode 3, air is supplied as an oxidizing gas from a blower 6. Since the working temperature of the PEFC proper 1 is generally set at 100° C. or less such as, for example, between 80° to 90° C. in consideration of the durability of the PE membrane 4, the PEFC proper 1 is cooled by circulating a coolant 8 through a cooling plate 7.

In this apparatus, a liquid fuel 9 such as alcohol is gasified with the heat of the coolant 8 by a fuel gasifier 10 and then introduced into the reformer 5. In other words, the heat produced in consequence of the generation of power by the PEFC proper 1 is utilized for the gasification. To the reformer 5, steam is introduced in combination with the vapor of the liquid fuel mentioned above. When a reaction tube (not shown) of the reformer 5 which has introduced the vapor and steam is heated with a burner 11, a reforming reaction proceeds on the liquid fuel and produces a hydrogen rich gas, namely the fuel gas. As respects the formation of the steam, a water gasifier 12 which, similarly to the fuel gasifier 10, utilizes as a heat source for the gasification the heat produced in consequence of the generation of power by the PEFC proper 1 converts water 13 into steam. The PE membrane 4 exhibits high conductivity in a thoroughly wetted state but virtually becomes an insulator in a dried state. Also in this sense, the fuel gas is made to contain the steam as described above.

The output of the PEFC proper 1 is controlled by controlling the fuel cell current with an output control apparatus 14 in accordance with an instruction for power generation. At the same time, the amount of the fuel gas and the amount of air are varied proportionately to the amount of the fuel cell current. In the diagram, 15 stands for a power conversion apparatus.

In the PEFC power generating apparatus which is constructed as described above, the PE membrane 4 represented by a perfluorocarbon sulfonic acid membrane is stable in the neighborhood of 85° C. and exhibits durability of at least 40,000 hours under the cell operating conditions. Since this PE membrane 4 succumbs to accelerated deterioration at a higher temperature (particularly 100° C. or more), the apparatus is so constructed as to maintain the temperature of the PE membrane 4 at a level in the proximity of 80° to 90° C. (working temperature) by flowing the coolant 8 through the cooling plate 7 and consequently cooling the PE membrane 4.

Since water is conventionally used as the coolant 8 and the boiling point of water is 100° C. (under the atmospheric pressure) as widely known, however, the use of water inevitably entails the disadvantage that the temperature of the water in circulation must be controlled strictly for the purpose of keeping the PE membrane 4 at a temperature near 85° C. which ensures the stablest existence of the PE membrane 4, though it is enabled to keep the temperature at 100° C. owing to the latent heat from the vaporization. When the cell is enlarged for increasing the power generating capacity of the PEFC, the lack of uniformity of the electromotive reaction within the cell surfaces manifests prominently and, as a result, the generation of heat becomes uneven and concentrates locally. When the coolant in use happens to be water, in this case, numerous portions of the PE membrane 4 reach 100° C., the boiling point of water, and the PE membrane 4 is seriously deteriorated in these portions. Thus, the disadvantage arises that the PE membrane 4 cannot be stably operated for a long time.

Since the apparatus of the conventional construction described above cannot be easily kept at a temperature of about 80° to 90° C. at which the PEFC is enabled to operate stably, an earnest desire has been expressed to enhance the stability of the PEFC enough to withstand the effect of aging.

For the sake of the operation of the apparatus constructed as illustrated in FIG. 14, the fact that the liquid raw materials inclusive of water, before they are fed into the reformer 5, are thoroughly gasified with the heat produced in consequence of the generation of power by the fuel cell and consequently enabled to undergo the reaction quickly in the reformer 5 constitutes itself an important point. The PEFC of the type which has a working temperature of 100° C. or less entails the disadvantage that since it is naturally incapable of producing steam in a sufficient amount, the reactivity of the liquid fuel in the reformer 5 is degraded and the PE membrane 4 is induced to suffer from deterioration.

In these circumstances, the desirability of conferring on the PEFC whose working temperature is not higher than 100° C. a construction which enables the apparatus to produce steam in a sufficient amount without requiring supply of heat from an external source, precludes otherwise possible loss of the power generating efficiency and, at the same time, offers a stable operation for a long time has been finding enthusiastic recognition.

SUMMARY OF THE INVENTION

This invention has been produced for the purpose of solving the problems conventionally encountered as described above. It has as a major object thereof the provision of a solid polymer electrolyte type fuel cell apparatus which enables the PEFC whose working temperature is not higher than 100° C. to offer a stable operation for a long time without sacrificing the power generating efficiency or succumbing to deterioration due to the effect of aging. To be specific, this invention is directed to providing a solid polymer electrolyte type fuel cell apparatus which can stably retain a working temperature of not higher than 100° C. and a solid polymer electrolyte type fuel cell apparatus which can produce steam in a sufficient amount even at such a working temperature as mentioned above.

The first solid polymer electrolyte type fuel cell apparatus contemplated by this invention comprises a fuel cell proper formed by superposing a plurality of unit cells having a solid polymer electrolyte membrane held between an anode and a cathode and a cooling mechanism adapted to circulate a coolant through the interior of the fuel cell proper and remove the heat produced during the generation of power, which fuel cell apparatus is characterized by the fact that the coolant mentioned above is a liquid having a boiling point closely approximating the working temperature of the fuel cell proper mentioned above.

In the solid electrolyte type fuel apparatus of this invention, first a liquid which has a boiling point closely approximating the working temperature of the PEFC proper thereof is used as the coolant. Thus, when the temperature of the fuel cell proper reaches the working temperature or the neighborhood of the boiling point of the coolant, the coolant begins to vaporize and the latent heat arising from the vaporization absorbs the heat generated by the PEFC proper and enables the temperature of the PEFC proper to remain constantly at the predetermined working temperature. Even when uneven heat regions occur in the cell surfaces of the PEFC, since the temperatures of such heat regions do not basically surpass the boiling point of the coolant, the temperature at which the PE membrane is allowed to retain a stable state for a long time (working temperature) can be retained. Thus, the impartation of a long service life to the PEFC proper can be accomplished.

The second solid polymer electrolyte type fuel cell apparatus contemplated by this invention comprises a fuel cell proper formed by superposing a plurality of unit cells having a solid polymer electrolyte membrane held between an anode and a cathode, a liquid raw material gasifying mechanism for gasifying water and a liquid fuel, a reformer for reforming the gasified water and liquid fuel to a hydrogen rich gas, a fuel gas supplying system for supplying the reformed gas to the anode, an oxidizing agent gas supplying system for supplying an oxidizing agent gas to the cathode, and cooling means for cooling the fuel cell and keeping the fuel cell at a predetermined working temperature with a coolant, which fuel cell is characterized by the fact that the liquid raw material gasifying mechanism is provided with at least two water gasifiers arranged in series and at least either of the waste heat from the reformer and the heat possessed by the reformed gas is utilized as at least part of the heat source for the gasification of water.

Further, the second solid polymer electrolyte type fuel cell apparatus is characterized by the fact that a turbo-compressor is used as the oxidizing agent gas supplying system mentioned above, the turbo-compressor is operated with the waste heat from the reformer, and the heat possessed by the oxidizing agent gas compressed by the turbo-compressor is utilized as part of the heat source for the gasification of water in the liquid raw material gasifying mechanism.

In the solid electrolyte type fuel cell apparatus of this invention, the waste heat from the reformer and the heat possessed by the reformed gas are utilized as the heat for the gasification of water as part of the liquid raw materials. These heats have a sufficient heat quantity. When the fuel cell apparatus additionally incorporates therein a heat exchanger for exchanging heat between these heats and the coolant, for example, it is enabled to obtain an ample supply of steam. As a result, the reactivity of the liquid fuel in the reformer can be precluded from degradation and the quality of the PE membrane prevented from deterioration. Thus, the impartation of a long service life to the PEFC proper and the enhancement of the efficiency thereof can be attained.

The third solid polymer electrolyte type fuel cell apparatus contemplated by this invention comprises a fuel cell proper formed by superposing a plurality of unit cells having held between a collector disposed on the anode side and a collector disposed on the cathode side a laminate consisting of an anode, a cathode, and a solid polymer electrolyte membrane held between the anode and the cathode, which fuel cell apparatus is characterized by the fact that the collector on the anode side is composed of a collector proper of porous carbon possessed of grooves destined to serve as a fuel chamber and an absorbent porous sheet disposed along the lateral surface of the collector proper just mentioned. The absorbent porous sheet is provided at the corners thereof with a water supplying mechanism.

Owing to the construction described above, the PE membranes used in the fuel cell apparatus can be wetted thoroughly in themselves by causing the collectors proper, the anode, and the PE membranes to be sequentially wetted through the absorbent porous sheets.

BRIEF DESCRIPTION OF THE DRAWINGS

FIG. 10 is a perspective view illustrating the construction of a collector on the anode side used in the unit cell shown in FIG. 9.

FIG. 11-$a$ is a cross section taken through FIG. 10 along the line 11$a$—11-$a$ and FIG. 11-$b$ a cross section taken through FIG. 10 along the line 11-$b$—11-$b$.

DESCRIPTION OF THE PREFERRED EMBODIMENTS

Now, preferred embodiments of the solid electrolyte type fuel cell apparatus of this invention will be described specifically below with reference to the accompanying drawings.

Figure 1:
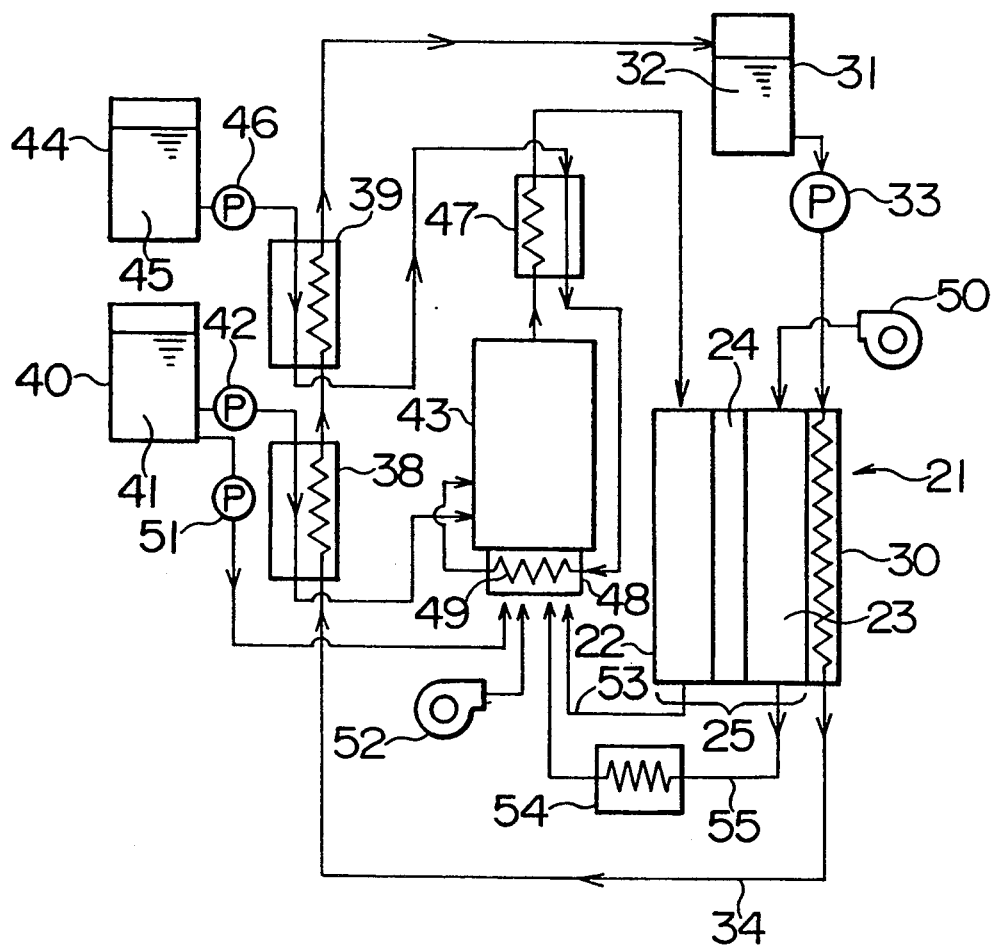
FIG. 1 is a diagram illustrating the construction of a PEFC apparatus as one embodiment of this invention.

FIG. 1 is a diagram illustrating schematically the construction of a solid electrolyte type fuel cell apparatus as one embodiment of this invention. In this diagram, 21 stands for a fuel cell proper formed by superposing a plurality of unit cells 25 having a solid polymer electrolyte membrane (PE membrane) 24 held between an anode 22 and a cathode 23, i.e. a PEFC proper.

Figure 2:
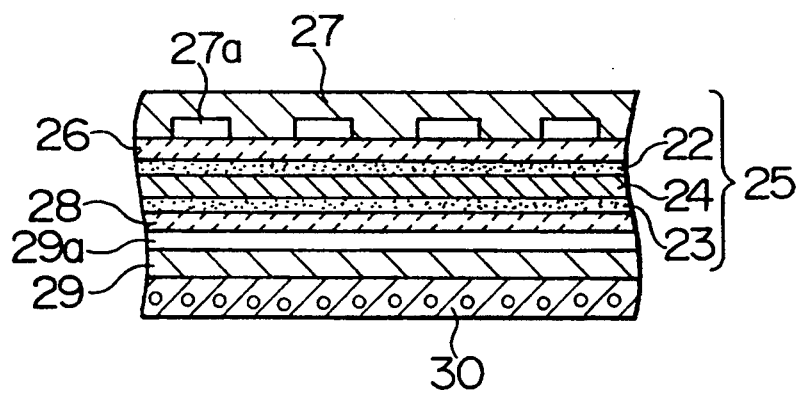
FIG. 2 is a cross section illustrating the construction of a unit cell in the PEFC apparatus as one embodiment of this invention.

One example of the construction of the unit cell 25 mentioned above is illustrated in FIG. 2. On the opposite surfaces of the PE membrane 24, an anode 22 of a fuel electrode and a cathode 23 of the oxidizing agent electrode 23 as a cathode are formed integrally with the PE membrane 24. The PE membrane 24 is formed of a perfluorocarbon sulfonic acid resin such as, for example, a proton-conducting ion-exchange resin like a product of DuPont's marketed under trademark designation of "Nafion." The anode 22 and the cathode 23 are gas-diffusing electrodes of a porous texture and combine the functions of a porous catalytic layer and a gas-diffusing layer. These electrodes 22 and 23 are formed of a porous matrix which has supported thereon through the medium of a hydrophobic resinous binder such as polytetrafluoroethylene minute conductive particles such as, for example, minute carbon particles carrying thereon a catalyst of platinum, palladium, or an alloy thereof.

On the other surface of the anode 22, a collector plate 27 made of a conductive substance such as, for example, carbon and provided with grooves 27$a$ destined to serve as a path for the fuel gas such as a reformed hydrogen-rich gas and form a fuel chamber is superposed through the medium of a porous carbon supporting member 26. On the other surface of the cathode 23, a collector plate 29 made of a conductive substance such as, for example, carbon, provided with paths for an oxidizing agent gas such as, for example, air disposed so as to intersect perpendicularly the aforementioned paths for the fuel gas, and possessed of grooves 29$a$ constituting an oxidizing agent chamber is superposed through the medium of a porous conductive water-repelling layer 28. These collector plates 27 and 29 additionally fulfill the function as a separator.

Figure 3:
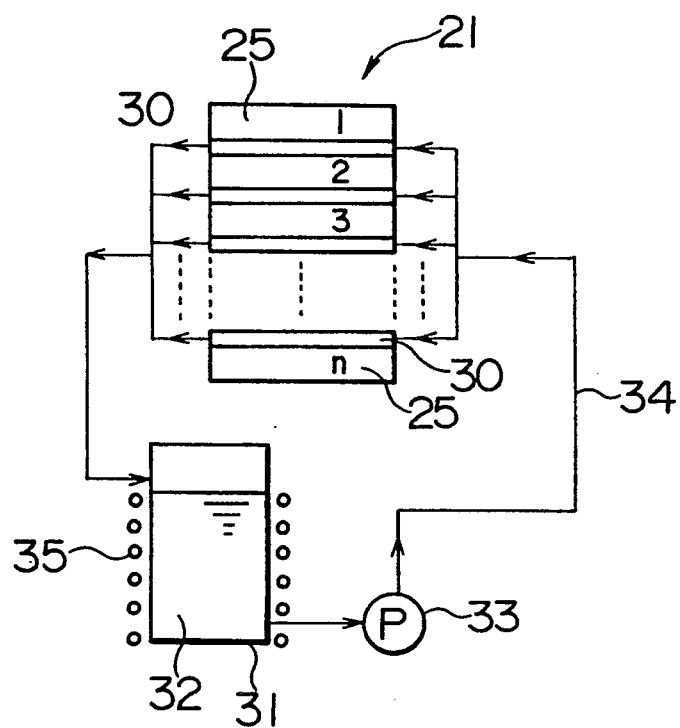
FIG. 3 is a diagram illustrating a route for the circulation of a coolant in the PEFC apparatus as one embodiment of this invention.
Figure 4:
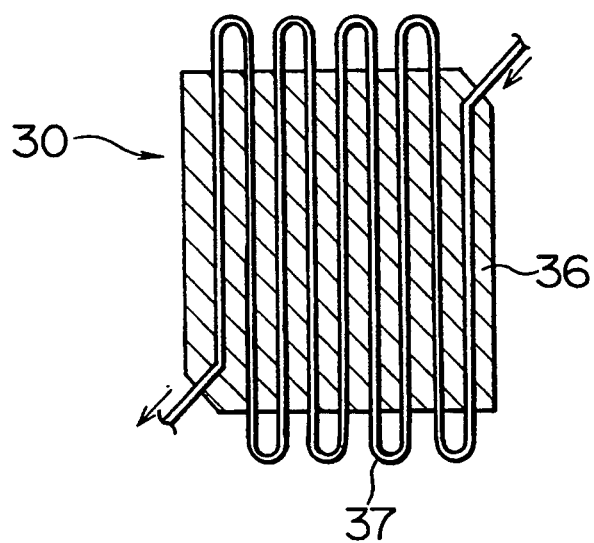
FIG. 4 is a diagram illustrating an example of the construction of a cooling plate used in the PEFC apparatus of this invention.

The laminate which consists of the PE membrane 24, anode 22, cathode 23, and collector plates 27, 29 forms the unit cell 25 of the PEFC. The PEFC stack or the PEFC proper 21 is constructed by having a plurality of such unit cells 25 superposed in series through the medium of cooling plates 30 as illustrated in FIG. 3. The heat which is produced in consequence of the generation of power by the PEFC proper 21 is removed by supplying a coolant 32 stored in a coolant tank 31 to the interior of the cooling plates by means of a coolant circulation pump 33. As a result, the PEFC proper 21 is operated at a working temperature of 100° C. or less, specifically in the range of about 80° to about 90° C., at which the PEFC proper 21 is allowed to operate stably. The coolant 32 is used cyclically by virtue of a coolant circulating pipe 34 and is cooled with cooling fins 35 which are provided for the coolant tank 31. FIG. 4 is a diagram illustrating one concrete example of the cooling plate 30. This cooling plate 30 comprises a cooling plate proper 36 made of a material excelling in thermal conductivity such as, for example, carbon, copper, or aluminum alloy and a coolant flowing pipe 37 embedded in the coolant plate proper 36. Alternatively, the cooling plate 30 may be produced by forming in a thin plate about 0.2 mm to 0.5 mm in thickness coolant flowing grooves equivalent to the pipe mentioned above.

In the solid electrolyte type fuel cell apparatus of this embodiment, a liquid having a boiling point closely approximating the working temperature of the PEFC proper 21 is used as the coolant 32. As the coolant 32, it is desirable to use an organic liquid which has a boiling point falling in the range of 10° C.± the working temperature set for the PEFC proper 21 or an organic liquid which has a boiling point of less than 100° C., though depending on the kind of the PE membrane 24 to be used. If the boiling point of the coolant is more than 10° C. higher than the working temperature of the PEFC proper 21, the possibility of the PE membrane 24 giving rise to hot spots grows and the deterioration of the PE membrane 24 accelerates. If the boiling point of the coolant is at least 10° C. lower than the working temperature, the working temperature of the PEFC proper 31 excessively falls possibly to the extent of inducing a decline of the power generating efficiency.

As concrete examples of the coolant of the nature described above, lower alcohols such as methanol and ethanol and fluorine type inert liquids satisfying the requirement of boiling point mentioned above may be cited. The fluorine type inert liquids which are effectively usable herein include low boiling liquids such as perfluorocarbon and substitutes therefor which are produced by substituting at least part of the hydrogen atoms of hydrocarbons by a fluorine or chlorine atom, for example. These fluorine type inert liquids prove ideal for coolants because they are nonflammable, excellent in safety, and rich in thermal conductivity.

Owing to the use of the coolant 32 which satisfies the requirement mentioned above, the latent heat arising from the vaporization of the coolant 32 enables the temperature of the PEFC proper 21 to remain at the working temperature, i.e. a temperature which closely approximates the boiling point of the coolant 32. If the PEFC proper 21 suffers occurrence of uneven heat regions in the cell surfaces, the working temperature at which the PE membrane 24 is allowed to remain in a stable state for a long time can be maintained because the temperatures of such heat regions do not surpass the boiling point of the coolant 32 in an abnormally large measure.

The coolant 32 which maintains the working temperature of the PEFC proper 21 at a constant level is cyclically used through the cooling plates 30 and the coolant circulation pipe 34 as described above. In the coolant circulation pipe 34, a liquid fuel gasifier 38 and a first water gasifier 39 are inserted. These gasifiers 38 and 39 are heat exchangers which make use of the heat produced in consequence of the generation of power by the PEFC proper 21 as the heat for gasification. A liquid fuel 41 such as alcohol which is stored in a liquid fuel tank 40 can be thoroughly gasified solely by the liquid fuel gasifier 38 through exchange of heat with the coolant 32 because it basically has a low boiling point. As a result, the liquid fuel is transferred from the liquid fuel tank 40 by a liquid fuel supplying pump 42 to the liquid fuel gasifier 38 and gasified therein. The vapor resulting from the gasification of the liquid fuel is introduced into a reformer 43.

In contrast to the liquid fuel, water 45 which is stored in a water tank 44 cannot be thoroughly gasified into steam because it fails to acquire sufficient heat through exchange of heat with the coolant 32. Thus, the water 45 is first delivered by a water supplying pump 46 to the aforementioned water gasifier 39, preheated therein, and subsequently transferred to a second water gasifier 47. This second water gasifier 47 is a heat exchanger which makes use of the heat of a reformed gas discharged from the reformer 43 as the heat for gasification. In the second water gasifier 47, the water 45 acquires ample heat because the reformed gas has a temperature of about 250° C. Since the reformed gas must be cooled to a level equaling the working temperature when it is prepared for supply to the PFEC proper 21, the second water gasifier 47 additionally functions as an apparatus for cooling the reformed gas.

The first and second water gasifiers 39 and 47 all by themselves suffice to generate steam in an ample amount, through depending on the amount of water. In the present embodiment, the water is finally gasified by a third water gasifier 49 which utilizes as the heat source thereof the waste heat from a heating burner 48 of the reformer 43 and the resultant steam is introduced into the reformer 43. Since the waste heat of the reformer burner 48 has a sufficient heat quantity, the third water gasifier 49 is capable of producing steam such as, for example, saturated steam, in a sufficient amount.

Thus, the water 45 is first heated (by the first water gasifier 39) with the heat of the coolant 32, then heated to a level closely approximating the boiling point through exchange of heat with the reformed gas (by the second water gasifier 47), and finally vaporized into steam through exchange of heat (by the third water gasifier 49) with the waste heat from the reformer burner 48. The resultant steam is introduced into the reformer 43. The formation of steam, therefore, can be ensured by making use of the heat possessed by the reformer inlet gas and the waste heat from the reformer burner 48 in addition to the heat of the coolant which is exclusively used in the conventional fuel cell.

The vaporized liquid fuel and the steam which have been introduced into the reformer 43 as described above are heated by the reformer burner 48 inside the reformer 43 and reformed into a steam-containing fuel gas, i.e. a hydrogen rich gas. This fuel gas is supplied to the anode 22 in the PEFC proper 21. To the cathode 23, air is supplied as an oxidizing agent gas from a blower 50. The generation of power is effected by supplying the fuel gas and the air to the PEFC proper 21 as described above.

To the reformer burner 48, a combustion-improving fuel such as methanol is supplied by a pump 51 and, at the same time, air is supplied by a blower 52. To the reformer burner 48 are connected a pipe 53 for supplying an exhaust gas containing the unreached hydrogen discharged from the anode 22 and a pipe 55 for supplying the reaction product condensed by a condenser 54 which is connected to the outlet side of the cathode 23. The piping is aimed at lowering the cost of combustion of the reformer burner 48.

Now, a concrete example of the solid electrolyte type fuel cell constructed as described above will be described below.

First, a PEFC proper 21 was constructed by superposing 10 unit cells 25 (measuring 300 mm×300 mm, for example) and interposing one cooling plate 30 per every two unit cells 25. The PEFC proper 21 was operated as kept cooled with a fluorine type inert liquid, specifically a perfluoroalkane having a boiling point of 80° C. as the coolant 32. During the operation with cooling, the central unit cell 25 (fifth cell) was tested for temperature distribution within the surfaces.

A comparative experiment of this invention was carried out by following the procedure of the working example cited above, except that water was used as the coolant and the working temperature of the cell was set at 85° C. as by controlling the amount of the coolant circulated. During the operation, the fifth cell was tested for temperature distribution within the surfaces.

Figure 5:
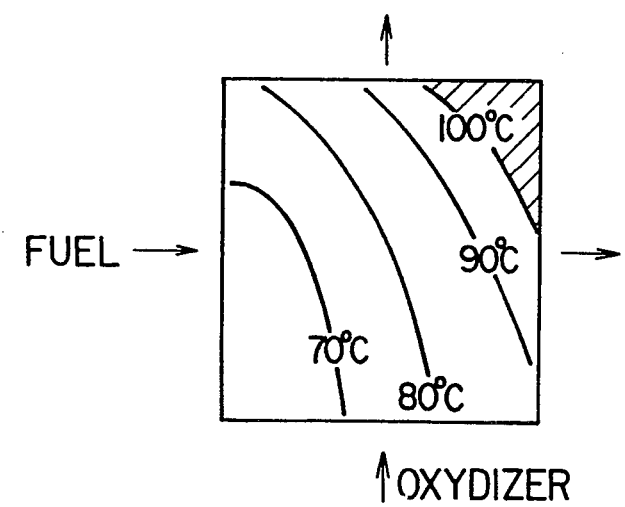
FIG. 5 is a diagram showing the temperature distribution in a cell during the cell operation of the conventional PEFC apparatus using water as a coolant.
Figure 6:
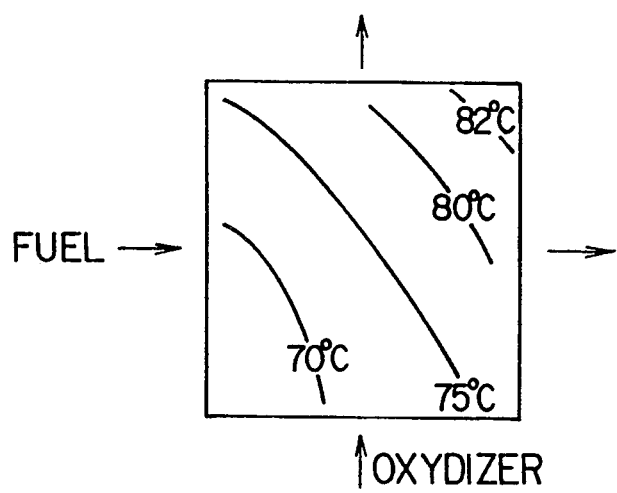
FIG. 6 is a diagram showing the temperature distribution in a cell during the cell operation of the PEFC apparatus as one embodiment of this invention.

FIG. 5 shows the temperature distribution obtained in the comparative experiment and FIG. 6 the temperature distribution obtained in the working example. It is clearly noted from FIG. 5 that in the comparative experiment using water as the coolant, hot spots occurred on the outlet sides for the fuel gas and the oxidizing agent gas. In contrast, it is noted from FIG. 6 that in the working example, the occurrence of hot spots was precluded and the cell operation was stably continued owing to the effective removal of heat by the low boiling coolant.

Figure 7:
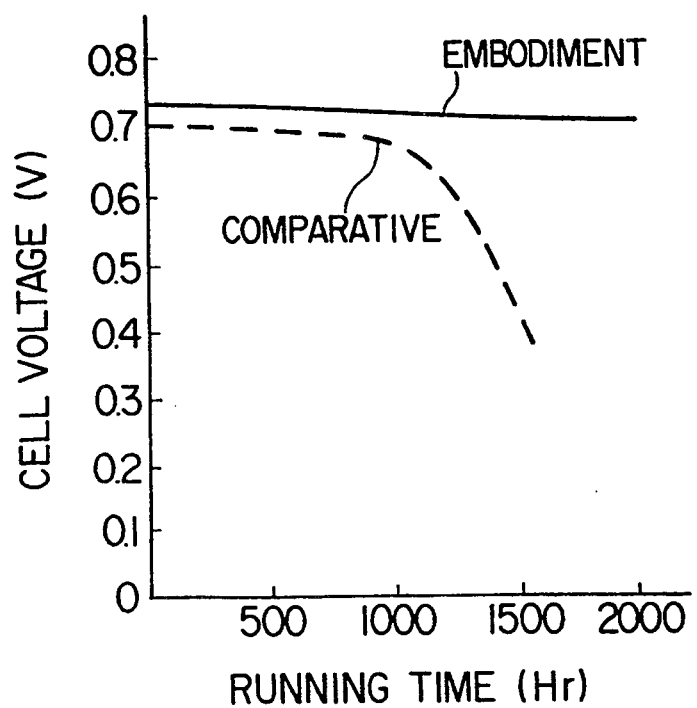
FIG. 7 is a diagram showing the cell characteristics of the PEFC apparatus as one embodiment of this invention in comparison with those of the conventional countertype.

FIG. 7 shows the time-course changes of cell voltage observed in the working example and the comparative experiment. The operating conditions of the cell were such as to maintain the working temperature (temperature at the center of the cell) at 85° C. It is clearly noted from FIG. 7 that the PEFC of the comparative experiment suffered deterioration of the PE membranes under the influence of hot spots and encountered gradual decline of the cell voltage after 1,000 hours' operation, whereas the PEFC of the working example could be operated stably for a long time.

When the solid polymer electrolyte fuel cell apparatus of the working example cited above was operated with the same coolant under the same operating conditions as described above to test for the amount of steam to be produced, it was found to be capable of producing steam in a sufficient amount. Even when a low boiling organic liquid, namely a liquid having a smaller capacity for heat exchange with the coolant than water, is used as the coolant, the heat of the reformed gas and the waste heat from the reformer burner 48 amply suffice for the purpose of the gasification. Thus, the steam can be produced in a sufficient amount. As a result, the reaction of reformation can be made to proceed efficiently with the reformer 43 and, at the same time, the deterioration of the PE membranes 24 due to the shortage of water supply can be precluded.

The working example cited above represents a case of using an organic liquid as the coolant. The utilization of the heat of the reformed gas and the waste heat from the reformer burner 48 as the heat source for gasification is effectively attained even when water is used as the coolant. To be more specific, when water is used as the coolant and the working temperature of the PEFC is 100° C., since the heat required for the gasification of water is not obtained sufficiently, the steam cannot be produced in a sufficient amount unless the heat of the reformed gas and the waste heat from the reformer burner 48 are utilized as the heat source for the gasification.

Figure 8:
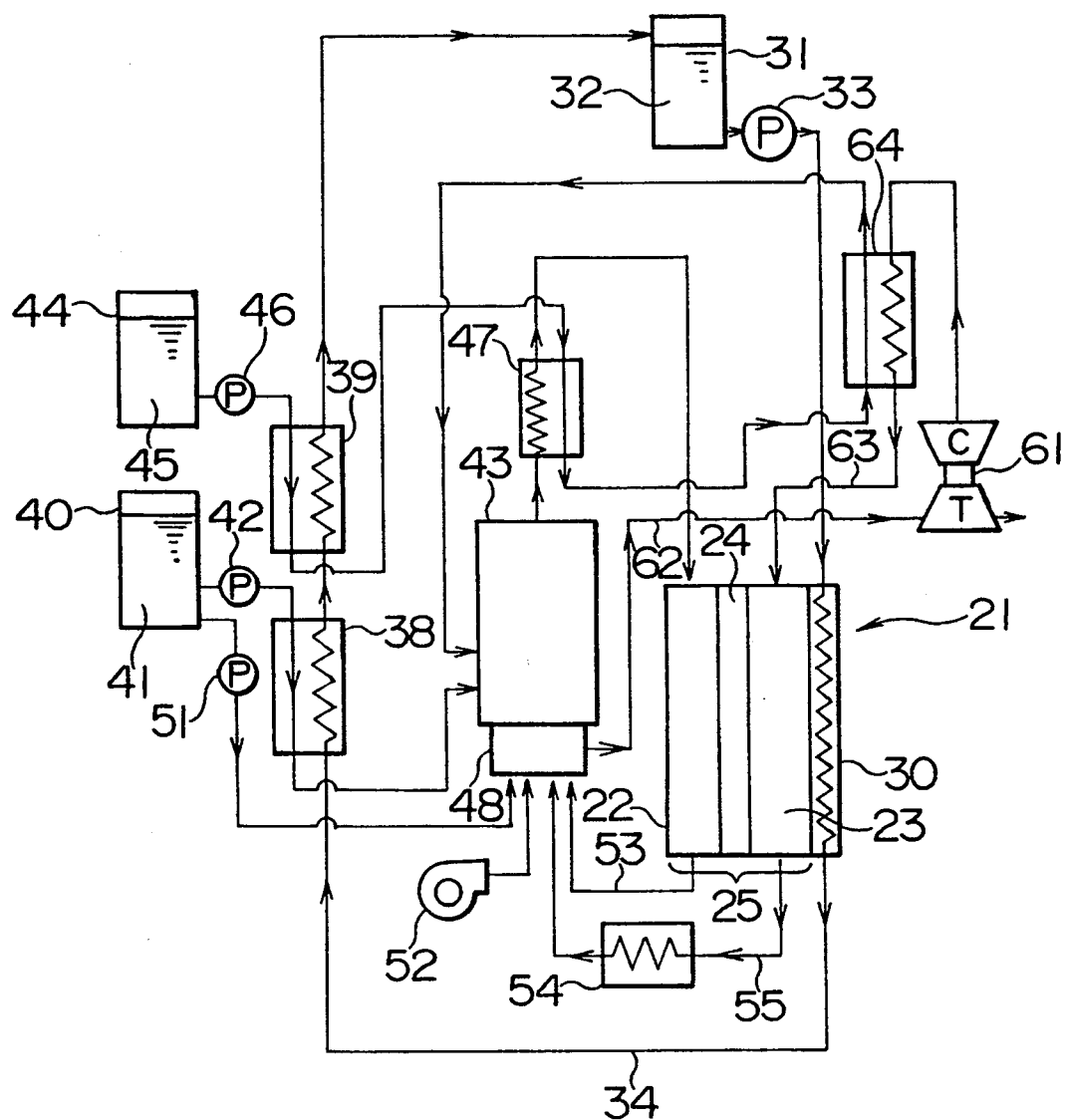
FIG. 8 is a diagram illustrating the construction of a PEFC apparatus as another embodiment of this invention.

Now, another preferred embodiment of this invention will be described below with reference to FIG. 8.

In the solid electrolyte type fuel cell apparatus of this embodiment, a turbo-compressor 61 is used as an oxidizing agent gas supplying system and the waste heat from the reformer burner 48 is supplied as a working heat through a supplying pipe 62 to the turbo-compressor 61. The turbo-compressor 61 is capable of supplying compressed air to the cathode 23 of the PEFC proper 21 and, therefore, further enhancing the cell performance. Since the compressed air discharged from the turbo-compressor 61 has a temperature of about 200° C., the heat possessed by this compressed air can be utilized as the heat for gasifying the water 45. In the present embodiment, therefore, a compressed air supplying pipe 63 is provided with a heat exchanger as a third water gasifier 64.

Specifically in the present embodiment, the water 45 stored in the water tank 44, similarly to that of the preceding embodiment, is first transferred by the water supplying pump 46 to the first water gasifier 39 and preheated therein with the heat of the coolant 32 and then forwarded to the second water gasifier 47 serving as a heat exchanger with the reformed gas. The water 47 heated further by the second water gasifier 47 is transferred to the third water gasifier 64 mentioned above and converted therein into steam. The steam is then introduced into the reformer 43.

The solid electrolyte type fuel cell apparatus of the present embodiment, similarly to that of the preceding embodiment, is capable of thoroughly gasifying the water 45 as part of the liquid raw materials into saturated steam and, consequently, enhancing the cell quality because it enables the waste heat from the reformer burner 48 to be used as the heat for operating the turbo-compressor 61, permits supply of compressed air and, at the same time, allows utilization of the heat possessed by the compressed air as part of the heat for gasification of the water 45.

When the solid electrolyte type fuel cell apparatus of the embodiment just described was operated with the same coolant under the same conditions as those of the preceding embodiment to test for the amount of steam to be generated, the results were as satisfactory as those of the experiment described above.

The embodiments cited thus far represent cases of utilizing the heat of the reformed gas, the waste heat from the reformer burner 48, and the heat of the compressed air in combination with the heat possessed by the coolant as the heat source for gasifying the water. Optionally, the apparatus may be constructed so that the gasification of the water will be effected by using these heats exclusive of the heat of the coolant.

The embodiment cited above represents a case of using as the liquid fuel an alcohol such as methanol. Optionally, the alcohol may be used in the form of a mixture with gasoline. This mixture of alcohol with gasoline is effectively usable not only for the solid electrolyte type fuel cell apparatus of this invention but also for fuel cells of varying kinds. This is because the hydrocarbons contained in the gasoline have boiling points of not higher than 160° C. vaporize at the working temperature 250° C. of the reformer, and yield to reformation on a catalyst and produce a hydrogen rich gas.

Incidentally, the solid electrolyte type fuel cell apparatus of the embodiments described thus far represent cases of using the heat of the reformed gas, the waste heat from the reformer burner 48, and the heat of the compressed air as the heat source for gasification, gasifying the water into steam, and causing the water of a pressure equivalent to that of saturated steam to be supplied as contained in the fuel gas. When a construction to be described hereinafter is adopted, for example, the water is enabled to be supplied to the PE membranes 24 separately of the fuel gas. The supply of this water is indispensable because the excessive supply of the fuel gas has the possibility of entailing a decline of the power generating efficiency when the degree with which the PE membranes are wetted is controlled by the flow volume of the fuel gas.

Figure 9:
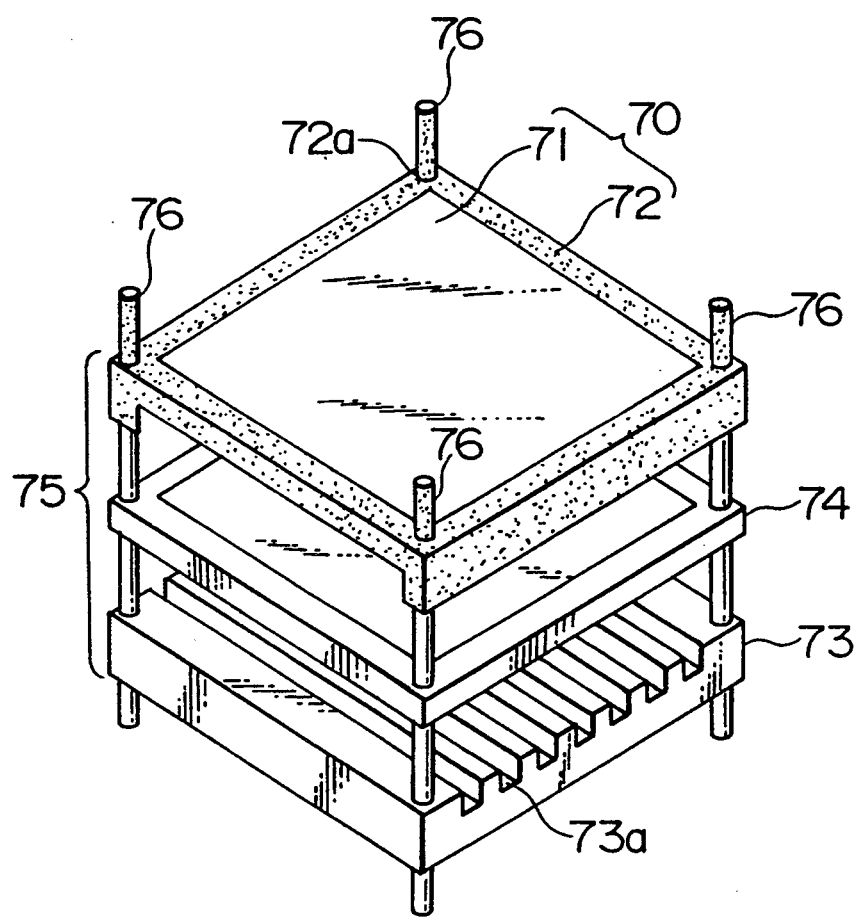
FIG. 9 is a perspective view illustrating the construction of a unit cell improved in the manner of supply of water.

A collector 70 on the anode side in the present embodiment is constructed as illustrated in FIG. 9 by disposing an absorbent porous sheet 72 along the lateral surfaces of a collector proper 71 which is made of porous carbon and provided with grooves destined to form a fuel chamber. As the absorbent porous sheet 72, a polymer porous sheet such as, for example, a porous sheet having a phenol resin as the main component thereof (specifically a product of Unitika Ltd. marketed under trademark designation of "Unibex") or a Kynol resin sheet may be used, for example.

Then, unit cell 75 is completed by having a laminate 74 of anode/PE membrane/cathode held between the collector 70 on the anode side and a collector 73 made of dense carbon and provided with grooves 73a destined to form an air chamber on the cathode side. Further, the absorbent porous sheet 72 is provided in the four corners thereof with a water supplying hole 72a. A porous insulating water-supplying pipe 76 made of porous polytetrafluoroethylene material containing pores of a diameter of about 1 $\mu$m to 2 $\mu$m, porous glass material containing pores of a diameter of about 10 $\mu$m, or porous ceramic material containing pores of a diameter of about 1 $\mu$m to 10 $\mu$m and having a porosity of about 40% to 60% is inserted into the water-supplying holes 72a to allow supply of the water to the absorbent porous sheet 72. A ceramic powder or powdery polymer material excelling in hygroscopicity may be packed in the parts interconnecting the water-supplying holes 72a and the porous water-supplying pipes 76 so as to facilitate smooth distribution of the water in the absorbent porous sheet 72.

A specific example of the anode side collector 70 provided with the absorbent porous sheet 72 is illustrated in FIG. 10 and FIG. 11. FIG. 11 - a represents a cross section taken through FIG. 10 along the line 11-a—11-a and FIG. 11 - b represents a cross section taken through FIG. 10 along the line 11-b—11-b. The anode side collector 70 is constructed by forming the absorbent porous sheet 72 in the shape of a frame, disposing the collector proper 71 of porous carbon as inserted in the frame of absorbent porous sheet 72 and, at the same time, having the absorbent porous sheet 72 disposed additionally in part of the grooves 71a. This construction enables the water to be uniformly supplied to the side of the collector proper 71 made of porous carbon. The height of the side of the absorbent porous sheet 72 lying perpendicularly to the direction of formation of the grooves 71a is desired to be about 0.1 mm to 0.2 mm lower than the web part (the wall parts remaining between the adjacent grooves 71a) 72b so as to avoid obstructing the flow of the gas.

The water supplied from the porous water-supplying pipe 76 flows through the absorbent porous sheet 72 and wets the collector 71 of porous carbon, the anode, and the PE membrane sequentially in the order mentioned. Thus, the PE membranes are thoroughly wetted automatically. The collector 73 on the cathode side is formed of a dense carbon plate and, therefore, will not induce the phenomenon of flooding due to excessive supply of water.

Figure 12:
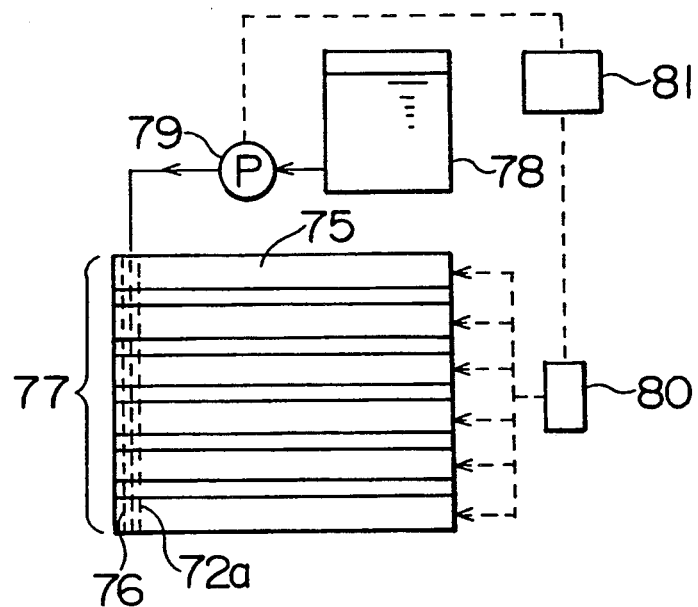
FIG. 12 is a diagram for aiding in the explanation of a method for supplying water to the unit cell shown in FIG. 9.
Figure 13:
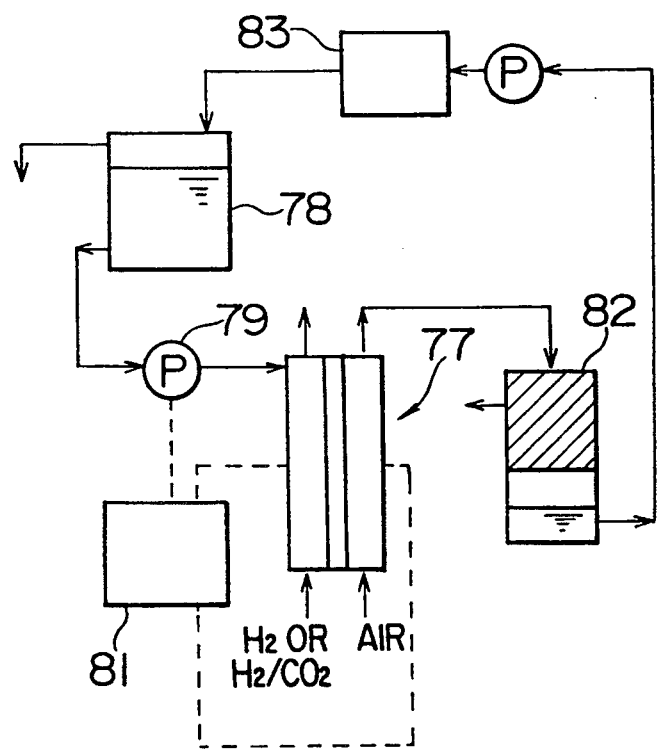
FIG. 13 is a diagram for aiding in the explanation of a method for circulating water to the PEFC using the unit cell shown in FIG. 9.
Figure 14:
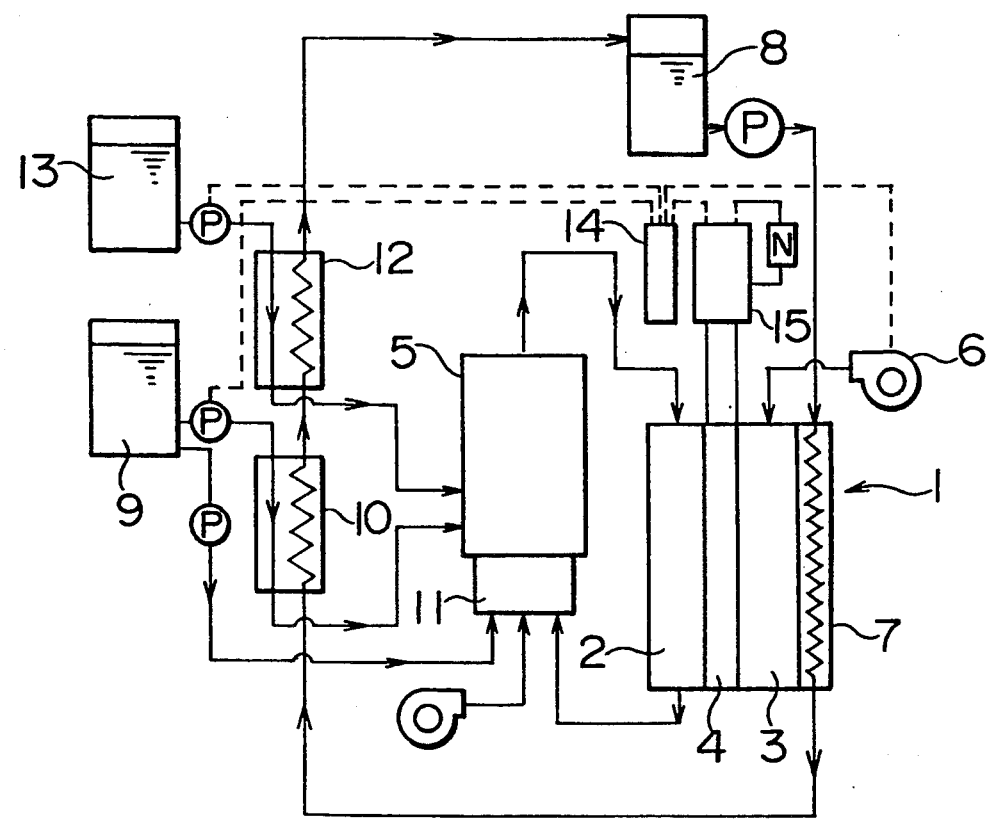
FIG. 14 is a diagram illustrating the construction of a conventional fuel cell apparatus.

FIG. 12 illustrates the method for supplying the water. For example, from a water tank 78 installed above a PEFC proper 77 formed by superposing unit cells 75, the water is supplied by means of a metering pump 79. In this case, the supply of the water is controlled with a control system 81 which continues measurement of the cell voltage of the PEFC proper 77 with a cell voltage monitor 80 and actuates a pump 79 whenever the rated voltage produces a prescribed drop ratio (5%, for example) so as to maintain the cell voltage at a constant level. In this manner, the amount of the water to be supplied can be controlled independently of the amount of the reaction gas. The supply of water to the water tank 78 may be effected, for example, by extracting water exclusively from the reaction product emanating from the cathode by means of a water separator 82, for example, further removing impurifying ions and impurifying substances included in the extracted water by means of a remover 83, and then forwarding the removed water to the water tank 78, as illustrated in FIG. 13. The impurifying ions can be removed with an ion-exchange resin and the impurifying substances with activated carbon, for example.

The method of supply of water to the PE membranes mentioned above can be applied as effectively to various fuel cells required to keep the electrolytes thereof wetted as to the solid electrolyte type fuel cell apparatus which are contemplated by this invention.

As described above, this invention can prevent the PEFC whose working temperature is not higher than 100° C. from degradation of the power generating efficiency or from deterioration of the quality due to the effect of aging because it permits stable maintenance of the working temperature of not higher than 100° C. and ensures production of steam in a sufficient amount even at the working temperature mentioned above. Thus, it allows provision of a solid polymer electrolyte type fuel cell which can be stably and efficiently operated for a long time.

What is claimed is:

1. A solid polymer electrolyte fuel cell apparatus comprising:

a fuel cell stack for producing electricity, said stack including a plurality of unit cells comprising a cathode, an anode and an electrolyte membrane of solid polymer, wherein said electrolyte is held between said anode and cathode; and cooling means for removing a generated heat during the generation of electricity, said cooling means including means for circulating a coolant in said fuel cell stack;

wherein said coolant is a liquid having a boiling point within ±10° C. of a setting temperature for operating said fuel cell stack.

2. The apparatus according to claim 1 wherein said coolant is at least one member selected from the group consisting of lower alcohols and fluorine-contained inert liquids and having a boiling point of less than 100° C.

3. The apparatus according to claim 1, wherein said cooling means further comprises a cooling plate provided in said fuel cell stack, a cooling tank adapted to store said coolant, a circulating pump for circulating said coolant, and a coolant circulating pipe for interconnecting the components of said cooling means, and said coolant circulating pipe has a liquid fuel gasifier and a first water gasifier inserted therein.

4. The apparatus according to claim 3, wherein said apparatus further comprises means for gasifying a liquid raw material, said gasifying means including a first water gasifier for gasifying water, a liquid fuel gasifier for gasifying a liquid fuel, and means for reforming said gasified water and liquid fuel to a hydrogen rich gas as a reformed gas, said reforming means including a reformer, wherein said gasifier means further comprises at least one selected from the group including a second water gasifier using heat of said reformed gas and a third water gasifier using waste heat from said reformer as a heat source.

5. A solid polymer electrolyte fuel cell apparatus, comprising:

a fuel cell stack for producing electricity, said fuel cell stack including a plurality of unit cells comprising a cathode, an anode and a solid polymer electrolyte membrane held between said cathode and anode;

means for gasifying a liquid raw material, said liquid raw material gasifying means comprising water gasifying means and liquid fuel gasifying means;

means for reforming said gasified water and liquid fuel to a hydrogen rich gas;

means for delivering said reformed gas to said anode;

means for delivering an oxidizing agent gas to said cathode; and means for cooling said fuel cell stack so as to maintain a temperature of said fuel cell stack within a preset temperature range by using a coolant, wherein said water gasifying means comprises at least a first water gasifier using waste heat from a reformer burner of said reforming means as a heat source.

6. The apparatus according to claim 5, wherein said water gasifying means further comprises a second water gasifier inserted in a midway point of a coolant circulation system included in said cooling means.

7. The apparatus according to claim 5, wherein said water gasifying means further comprises a second water gasifier using a portion of heat of the reforming means as at least a partial heat source.

8. The apparatus according to claim 5, wherein said liquid fuel gasifying means includes a liquid fuel gasifier inserted in a midway point of a coolant circulation system included in said cooling means.

9. The apparatus according to claim 5, wherein a boiling point of said coolant is within ±10° C. of a setting temperature for operating said fuel cell stack.

10. The apparatus according to claim 5, wherein said coolant is at least one member selected from the group consisting of lower alcohols and fluorine-contained inert liquids and having a boiling point of less than 100° C.

11. A solid polymer electrolyte fuel cell apparatus, comprising:
a fuel cell stack for producing electricity, said fuel cell stack including a plurality of unit cells comprising a cathode, an anode and a solid polymer electrolyte membrane held between said cathode and anode;
means for gasifying a liquid raw material, said gasifying means comprising a water gasifier for gasifying water and a liquid fuel gasifier for gasifying liquid fuel;
means for reforming said gasified water and liquid fuel to a hydrogen-rich gas;
means for delivering said reformed gas to said anode;
means for delivering an oxidizing agent gas to said cathode; and
means for cooling said fuel cell stack so as to maintain a temperature of said fuel cell stack within a preset temperature range by using a coolant, wherein said oxidizing agent gas delivering means includes a turbo-compressor, said turbo-compressor being operated with waste heat from a reformer burner, and a heat source for gasifying said liquid raw material comprises heat of said oxidizing agent gas when compressed by said turbo-compressor.

12. The apparatus according to claim 11, wherein a boiling point of said coolant is within ±10° C. of a temperature for operating said fuel cell stack.

13. The apparatus according to claim 11, wherein said coolant is at least one member selected from the group consisting of lower alcohols and fluorine-contained inert liquids and having a boiling point of less than 100° C.

14. A solid polymer electrolyte fuel cell apparatus comprising:
a fuel cell stack for producing electricity, said fuel cell stack having a plurality of unit cells, each said unit cell comprising a laminate consisting of an anode, a cathode and a solid polymer electrolyte membrane held between said anode and cathode, and nipped between a collector disposed on an anode side of said laminate and a collector disposed on a cathode side of said laminate;
said collector disposed on the anode side comprising a collector proper of a porous carbon having a multiplicity of grooves destined to serve as a fuel chamber and a water-absorbent porous sheet disposed along a lateral surface of said collector proper.

15. The apparatus according to claim 14, wherein at least a part of said water-absorbent porous sheet is provided with at least one water supplying mechanism.

16. The apparatus according to claim 14, wherein said collector disposed on the cathode side is composed of a dense carbon member having a plurality of grooves destined to form an oxidizing agent chamber.

17. The apparatus according to claim 14, wherein said water-absorbent porous sheet is further provided for part of said multiplicity of grooves.

* * * * *